United States Patent [19]

Mittendorf et al.

[11] 4,133,105
[45] Jan. 9, 1979

[54] INTERNAL PIPE CUTTER

[75] Inventors: Richard J. Mittendorf, Berlin Heights; Raymond H. Morris, Newcomerstown, both of Ohio

[73] Assignee: Emerson Electric Co., St. Louis, Mo.

[21] Appl. No.: 834,060

[22] Filed: Sep. 16, 1977

[51] Int. Cl.² .............................................. B23D 21/06
[52] U.S. Cl. ...................................................... 30/103
[58] Field of Search .................................. 30/103, 107

[56] References Cited
U.S. PATENT DOCUMENTS 3,406,449  10/1968  Doerner ................................. 30/107

Primary Examiner—Al Lawrence Smith
Assistant Examiner—J. T. Zatarga
Attorney, Agent, or Firm—Polster, Polster and Lucchesi

[57] ABSTRACT

An internal pipe cutter of simplified construction allows easy conversion from a large-diameter pipe cutting configuration to a small-diameter pipe cutting configuration. An arm carrying a pressure roller assembly is pivoted to a body part carrying a rotatable cutter. The pressure roller assembly is pivotable from one side of the arm to the other for accommodating different pipe sizes. The body is adjustably mounted in a support member carrying a diameter adjusting screw, a depth adjusting set screw and a handle.

8 Claims, 6 Drawing Figures

INTERNAL PIPE CUTTER

BACKGROUND OF THE INVENTION

This invention relates to internal pipe cutters. Internal pipe cutters are used to cut pipes and tubes from within, particularly when the pipe is to be cut flush with a floor or wall. For convenience, throughout this specification and claims, the pipe will be considered to be vertical.

Internal pipe cutters are presently known which will cut pipe of certain dimensions. An excellent example of such a cutter is shown in Doerner, U.S. Pat. No. 3,406,449 (1968). The device shown in the Doerner patent has been made commercially. The device includes a vertically adjustable frame member and a pressure bar pivoted to it. The frame carries a rotatable cutter and the pressure bar carries a pair of vertical rollers sized to fit a three-inch pipe. To accommodate a two-inch pipe, a second, more closely spaced pair of vertical rollers are provided on the other end of the pressure bar. To make the adjustment, the pressure bar pivot is removed, and the pressure bar is inverted. The device is not well adapted to cutting pipe of other sizes, and the adjustment for the two pipe sizes is awkward. In addition, the structure of the cutter is somewhat more delicate than might be desired.

SUMMARY OF THE INVENTION

One of the objects of this invention is to provide an internal pipe cutter which is easier to adjust for pipes of different diameter than previously known internal pipe cutters.

Another object is to provide such a cutter which may be adjusted to cut pipe having a wider variety of diameters than previously known cutters.

Another object is to provide such a cutter which is easily adjusted to making cuts at different depths.

Another object is to provide such a cutter which is simple and rugged in construction.

Other objects will occur to those skilled in the art in light of the following description and accompanying drawings.

In accordance with this invention, an internal pipe cutter is provided comprising a body member and an arm member pivoted together. The body member carries a rotatable cutter at its free end and the arm member carries at its free end a pressure assembly including a spider carrying a pair of rollers rotatable about generally vertical axes. To accommodate pipes of different sizes, pivot means are provided for moving the pressure assembly from the side of the arm member away from the body member, to accommodate relatively large pipe (for example, four inch tube), to the side of the arm adjacent the body part, to accommodate relatively small pipe (for example, two and one half inch tube).

Preferably, the pipe cutter includes a support member including a horizontal surface adapted to engage an end of a pipe. The support member includes a boss having a vertical opening in which the body member is slidably mounted. The boss also includes a threaded bore into which is threaded an adjustment screw for adjusting the spacing between the pressure assembly and the rotatable cutter. The adjustment screw extends through a slot in the body member and bears against the arm member to spread the arm member from the body member. A second screw threaded through the boss engages the body member and sets the depth of the rotatable cutter. A second boss on the support member carries a second handle.

The arm member includes a portion which is bent outwardly from the body member to increase the effective width of the pipe cutter when the pressure assembly is on the "away" side of the arm member. The spider carrying the rollers is relieved to permit the rollers to assume a vertical position even when the pressure assembly is on the "adjacent" side of the arm member.

DESCRIPTION OF THE PREFERRED EMBODIMENT

Figure 1:
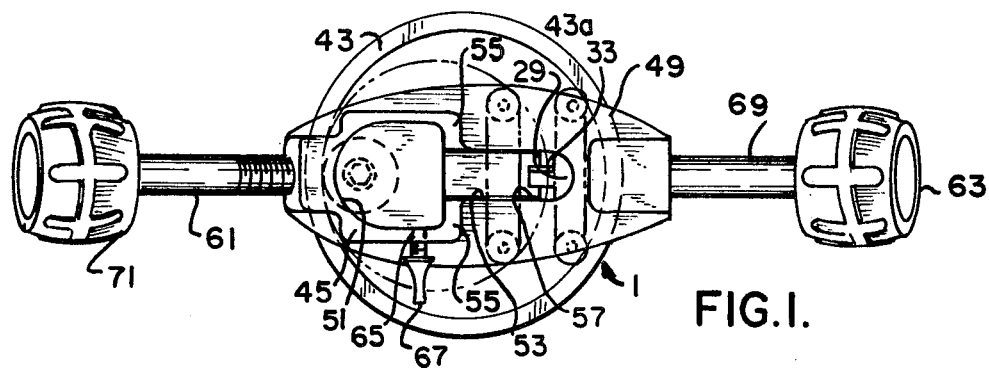
FIG. 1 is a top plan view of one embodiment of internal pipe cutter of the present invention with an alternative position of a cutter assembly and a small diameter pipe both shown in phantom lines.

Referring now to the drawings, reference numeral 1 indicates one illustrative embodiment of internal pipe cutter of the present invention. The pipe cutter 1 includes a body part 3, an arm part 5 pivoted to the body part as indicated at 7, and a support member 9 in which the body part 3 is vertically slidable.

The body part 3 is a malleable casting having at the end opposite the pivot 7 a hardened steel rotatable cutter blade 11, rotatably mounted on a collar 15 and held to the body part 3 by a screw 17. In this illustrative example, the rotating cutter 11 has a diameter of about one and three-eighths inch. A vertical slot 19 through the body part 3 extends from near the lower end of the body (as viewed in the Figures) to the top of the body part, and a portion 21 of the slot 19 also extends through the body part. The slot 19 allows the arm part 5 to pivot to a completely vertical position and, with the portion 21 of the slot, also provides an access opening for an adjustment screw as described hereinafter.

The arm part 5 is a steel bar, the free end of which is bent away from the body part as shown at 23. At its free end, the arm part 5 is bifurcated to form a bail 25 which carries a tail part 27 of a pressure assembly 29 by means of a pivot pin 31. A spring washer 33 between the bail 25 and the tail part 27 holds the pressure assembly 29 in any position to which it is manually moved. The ends of the bail 25 are rounded to allow the pressure assembly 29 to be rotated from the side of the arm part 5 facing the body part 3 to the opposite side.

The tail part 27 of the pressure assembly 29 is the central part of a cast steel roller cage 35, carrying at its ends a pair of generally vertical rollers 37. The rollers are adapted to bear against the wall of a pipe in the process of cutting it. The rollers, in this illustrative embodiment, are spaced apart about two and one quarter inches, outside edge to outside edge. The tail part 27 spaces the plane between the axes of the rollers about one half inch from the pivot pin 31. The roller cage 35 relieved, as indicated at 39 to clear the arm part 5 and allow the rollers 37 to stand vertically even when the pressure assembly is on the side of the arm adjacent the body part 3 and the body part and arm part are spaced apart their minimum spacing.

The support member 9 is a casting, one surface 41 of which is generally smooth and horizontal, for engaging the open end of a pipe 43 or 43a. The support member 9 includes a first boss 45 at one end of the support member 9, on the side opposite the surface 41, a second boss 47 at the other end of the support member 9, on the side opposite the surface 41, and a web 49 connecting the bosses 45 and 47.

The first boss 45 includes a vertical opening 51 which is congruent with the cross-section of the body part 3 and in which the body 3 is slidably mounted. A vertical slot 53 on the inner side of the boss is defined by a pair of legs 55. The slot 53 permits the arm part 5 to move into the slot 19 in the body part.

An axial opening 57 in the web 49 permits the arm part 5 to swing outwardly away from the body part 3.

A threaded bore 59 in the first boss 45 extends axially of the support member, at a slight angle toward the surface 41. Into the bore 59 is threaded an adjustment screw 61 having a knob 71 at its outer end. The adjustment screw extends through the slot 19 in the body part 3, through the slot 53 in the first boss 45 and into the opening 57 in the web 49, where it engages the arm part 5, thereby setting the distance between the pressure assembly 29 and rotating cutter blade 11.

A second threaded bore 65, in the side of the first boss 45, is provided for a thumb screw 67. The thumb screw 67 engages the body part 3 and fixes the vertical position of the body part 3 with respect to the support member 9, thereby fixing the axial depth within the pipe 43 or 43a at which the cutter blade cuts the pipe.

A handle 69 having a knob 63 at its outer end is screwed tightly into the second boss 47, symmetrically with the adjustment screw 61.

Figure 2:
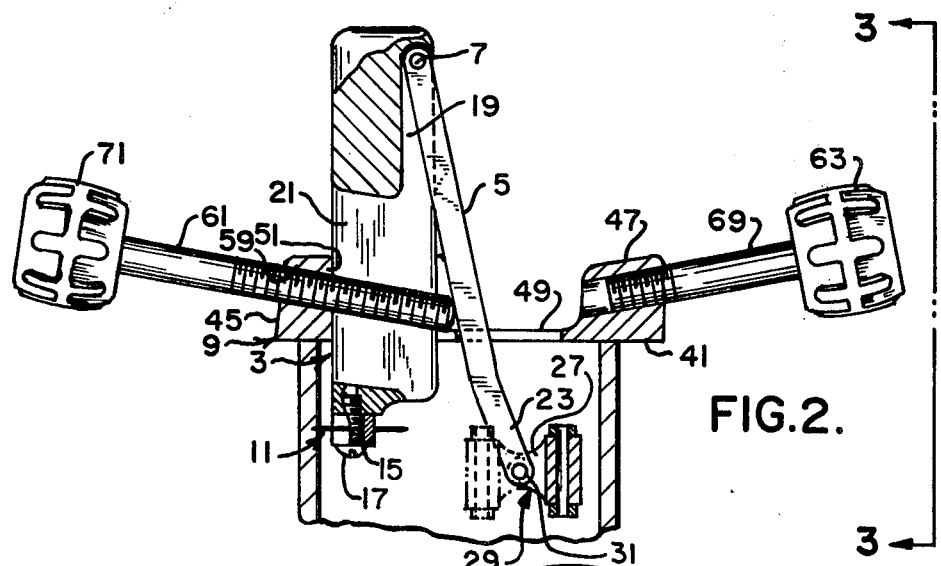
FIG. 2 is a view in side elevation, partially cut away, of the pipe cutter of FIG. 1.
Figure 4:
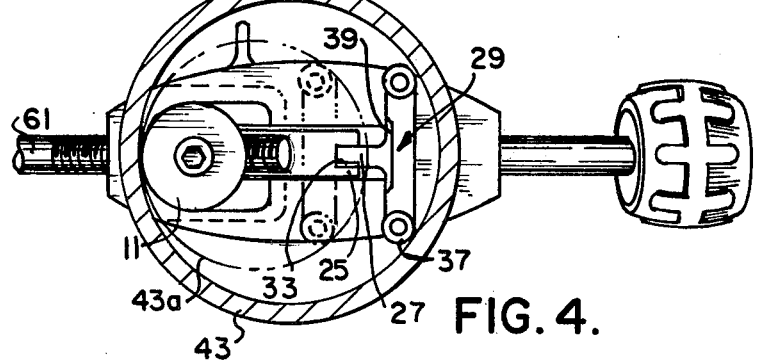
FIG. 4 is a bottom plan view of the pipe cutter of FIGS. 1-3.
Figure 3:
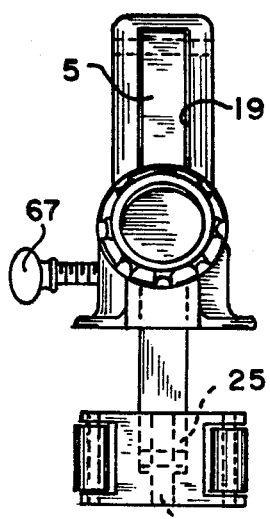
FIG. 3 is a view in end elevation, as indicated by line 3—3 of FIG. 2, of the internal pipe cutter of FIGS. 1 and 2 with a pipe being cut removed for clarity.
Figure 5:
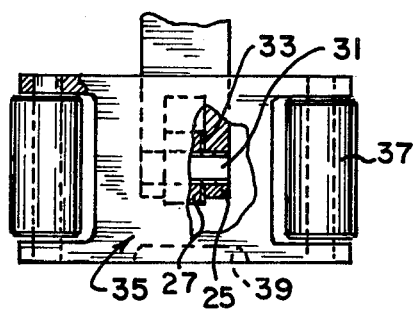
FIG. 5 is a detail of a pressure assembly portion of the pipe cutter of FIGS. 1-4.
Figure 6:
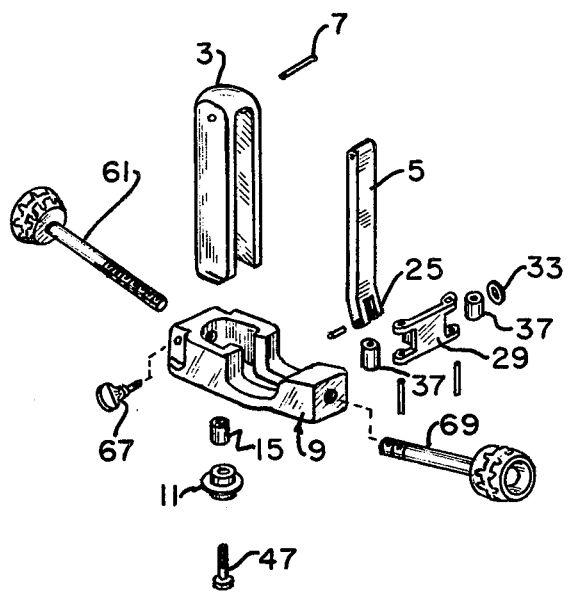
FIG. 6 is an exploded view showing the parts of the pipe cutter of FIGS. 1-5.

In operation, the pressure assembly 29 is turned to the side of the arm part 5 adjacent the body part 3 for cutting a pipe 43a of a diameter only slightly larger than the distance between the rollers 37, for example a two and one-half inch to three inch pipe. This position of the pressure assembly 29 is shown in broken lines in FIGS. 1 and 2. For cutting a pipe 43 of larger diameter, for example a three to five inch pipe, the pressure assembly 29 is turned to the opposite side of the arm 5, as shown in solid lines in FIGS. 1 and 2. The thumb screw 67 is loosened, and the body part 3 is slid to set the proper axial depth of cut before the thumb screw 67 is again tightened. In the illustrative embodiment, the slot 19 in the body part 3 permits variable adjustment from a depth of less than one-half inch to a depth of about two and one-half inches. The cutter 1 is then inserted into the pipe 43 or 43a with the surface 41 of the support member against the end of the pipe, and the adjustment screw 61 is tightened to cause pressure assembly to force the rotating cutter blade 11 into the side of the pipe. The cutter 1 is rotated by means of the knobs 63 and 71, and pressure is maintained by periodically tightening the adjustment screw 61 until the pipe has been cut through.

Numerous variations in the internal pipe cutter of the present invention, within the scope of the appended claims, will occur to those skilled in the art in light of the foregoing description. Merely by way of illustration, the adjustment to accommodate pipes of different sizes by rotating the pressure assembly from one side of an arm to the other may be accomplished with other configurations of the arm and body parts, and other means to set the axial depth of cut. The size of the pressure assembly may be reduced for a cutter designed to cut smaller pipe, for example pipe of one and one-quarter inch diameter. The handle and second knob are convenient, but may be omitted, especially in cutters designed to cut smaller pipe. These variations are merely illustrative.

We claim:

1. In an internal pipe cutter comprising first and second relatively movable members pivoted together, a cutter blade at the free end of said first member, and a pressure assembly at the free end of said second member, said pressure assembly comprising a pair of rollers rotatable about generally vertical axes, the improvement comprising adjustment means for accomodating pipes of different sizes, said adjustment means comprising pivot means for moving said pressure assembly alternatively from a first side of said second member adjacent said first member for cutting pipes of relatively small size, to a second, opposed, side of said second member for cutting pipes of relatively large size.

2. The improvement of claim 1 wherein said first member comprises a vertical body part including a vertical slot therein, said second member being pivotable into and out of said slot.

3. The improvement of claim 2 further including a support member including a horizontal surface adapted to engage an end of a pipe, said support member including opening means therein for slidably supporting said body member at adjustable vertical positions.

4. The improvement of claim 3 further including a threaded bore in said support member and a feed screw threaded into said bore, said feed screw extending through said slot in said body member and bearing against said second member for spreading said second member from said body member.

5. The improvement of claim 4 wherein said second member includes a portion at its free end which is bent outwardly from said body member.

6. The improvement of claim 5 wherein said pressure assembly is relieved for permitting said pressure assembly to assume a vertical position when said pressure assembly is on said first side of said second member.

7. The improvement of claim 6 wherein said cutter blade and said pressure assembly are sized to cut pipe having an internal diameter substantially as small as the distance between the rollers when said pressure assembly is moved to said first side of said second member.

8. The improvement of claim 1 further including spring means for frictionally positioning said pressure assembly with respect to said second member.

* * * * *